United States Patent
Hsieh

(10) Patent No.: US 9,716,985 B2
(45) Date of Patent: Jul. 25, 2017

(54) SCHEME CAPABLE OF TREATING MULTICAST/BROADCAST FRAME(S) AS UNICAST FRAME(S) AND TRANSMITTING MULTICAST/BROADCAST FRAME(S) BY USING UNICAST TRANSMISSION IN WIRELESS NETWORK

(71) Applicant: HTC Corporation, Taoyuan (TW)

(72) Inventor: Jing-Rong Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 115 days.

(21) Appl. No.: 14/740,268

(22) Filed: Jun. 16, 2015

(65) Prior Publication Data

US 2015/0373505 A1  Dec. 24, 2015

Related U.S. Application Data

(60) Provisional application No. 62/014,125, filed on Jun. 19, 2014.

(51) Int. Cl.
*H04W 4/06* (2009.01)
*H04W 88/08* (2009.01)

(52) U.S. Cl.
CPC .............. *H04W 4/06* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,344,857 B1 * | 5/2016 | Kazeminejad | H04W 4/06 |
| 2009/0219848 A1 * | 9/2009 | Lohmar | H04W 8/06 370/312 |
| 2010/0260091 A1 * | 10/2010 | Seok | H04L 12/1886 370/312 |
| 2013/0279391 A1 * | 10/2013 | Gupta | H04L 12/189 370/312 |
| 2014/0161014 A1 * | 6/2014 | Sasaki | H04W 4/06 370/311 |
| 2014/0192691 A1 * | 7/2014 | Vyas | H04W 4/06 370/311 |

* cited by examiner

*Primary Examiner* — Robert C Scheibel
(74) *Attorney, Agent, or Firm* — Winston Hsu

(57) ABSTRACT

An electronic device includes a storage unit and a processing unit. The storage unit is configured for storing specific information. The processing unit is coupled to the storage unit and for controlling and accessing the storage unit. The processing unit is capable of accessing the specific information within the storage unit to control the electronic device to send the specific information to an access point device so as to make the access point device treat a multicast/broadcast frame as a unicast frame and transmit the unicast frame by using unicast transmission.

17 Claims, 3 Drawing Sheets

SCHEME CAPABLE OF TREATING MULTICAST/BROADCAST FRAME(S) AS UNICAST FRAME(S) AND TRANSMITTING MULTICAST/BROADCAST FRAME(S) BY USING UNICAST TRANSMISSION IN WIRELESS NETWORK

CROSS REFERENCE TO RELATED APPLICATIONS

This application claims priority of U.S. provisional application Ser. No. 62/014,125 filed on Jun. 19, 2014, which is entirely incorporated herein by reference.

BACKGROUND OF THE INVENTION

1. Field of the Invention

The present invention relates to a wireless network transmission scheme, and more particularly to a scheme capable of transmitting multicast/broadcast frame(s) by using unicast transmission in a wireless network.

2. Description of the Prior Art

Generally speaking, in a wireless network, a conventional access point device is arranged to transmit multicast/broadcast frame(s) by using traditional multicast/broadcast transmission, and the conventional access point device is arranged for informing non-AP stations of the multicast/broadcast frame(s) to be transmitted by sending one delivery traffic indication map (DTIM) beacon to the stations. However, the time interval between two transmissions of DTIM beacons is longer. Thus, if the multicast/broadcast frame(s) is due to a service request by a service searching station, then this inevitably introduces a longer service discovery delay. It is important to reduce the longer service discovery delay.

SUMMARY OF THE INVENTION

Therefore one of the objectives of the present invention is to provide a scheme capable of making an access point device use unicast transmission to transmit multicast/broadcast frame(s) more early, to solve the above mentioned problems.

According to an embodiment of the present invention, an electronic device is disclosed. The electronic device comprises a storage unit and a processing unit. The storage unit is configured for storing specific information. The processing unit is coupled to the storage unit and for controlling and accessing the storage unit. The processing unit is capable of accessing the specific information within the storage unit to control the electronic device to send the specific information to the access point device so as to make the access point device treat a multicast/broadcast frame as a unicast frame and transmit the unicast frame by using unicast transmission.

According to an embodiment of the present invention, an access point device is disclosed. The access point device comprises a storage unit and a controlling unit. The controlling unit is coupled to the storage unit and configured for controlling and accessing the storage unit. The controlling unit is capable of controlling the access point device to treat a multicast/broadcast frame as a unicast frame and transmit the unicast frame to an electronic device by using unicast transmission according to specific information stored within the storage unit.

According to an embodiment of the present invention, a method operating on an electronic device is disclosed. The method comprises: using a storage unit for storing specific information; accessing the specific information within the storage unit; and sending the specific information to the access point device so as to make the access point device treat a multicast/broadcast frame as a unicast frame and transmit the unicast frame by using unicast transmission.

According to an embodiment of the present invention, a method operating on an access point device for wirelessly communicating with at least one electronic device is disclosed. The method comprises: using a storage unit for storing specific information; accessing the specific information of the storage unit; and treating a multicast/broadcast frame as a unicast frame and transmitting the unicast frame to an electronic device by using unicast transmission according to specific information stored within the storage unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
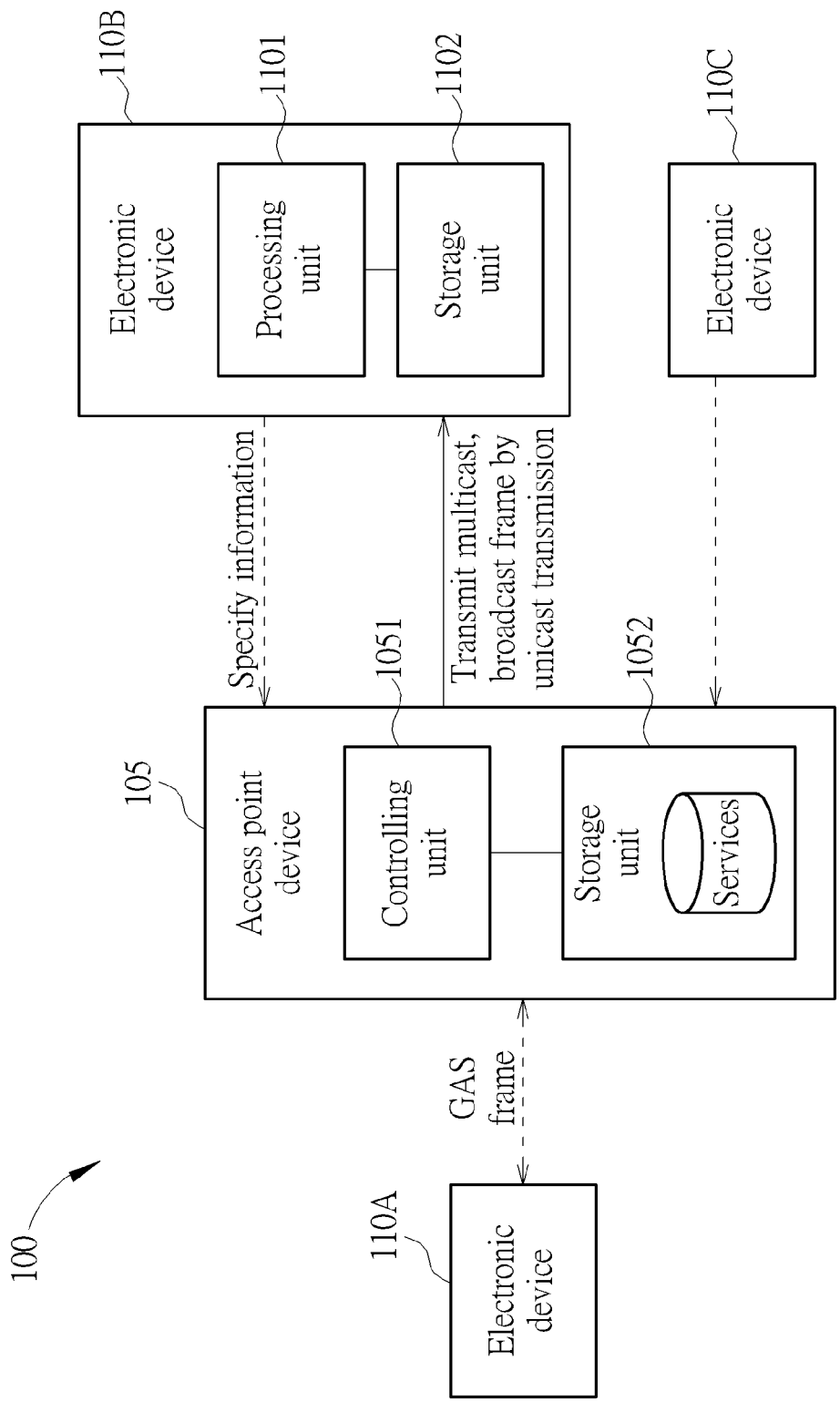
FIG. 1 is a simplified diagram of a wireless system including an access point device and multiple electronic devices according to an embodiment of the invention.

Please refer to FIG. 1, which is a simplified diagram of a wireless system 100 including an access point device 105 and multiple electronic devices 110A, 110B, 110C according to an embodiment of the invention. The electronic devices 110A-110C are non-access point (non-AP) stations and maybe include mobility or not. This is intended to be a limitation of the invention. In this embodiment, each electronic device 110A-110C is capable of wirelessly communicating with the access point device 105 via IEEE 802.11 communication standard to transmit uplink data to the access point device 105 and/or receive downlink data from the access point device 105.

Specifically, the access point device 105 comprises a controlling unit 1051 and a storage unit 1052. In addition, each electronic device includes a processing unit and a storage unit. For example, the electronic device 110B includes the processing unit 1101 and the storage unit 1102. The storage units 1052 and 1102 can be implemented by hardware elements, and the controlling unit 1051 and processing unit 1101 can be implemented by hardware circuits, software modules/application/programs, and/or any combinations of hardware circuits and software modules/application/programs. This is not intended to be a limitation of the present invention. The controlling unit 1051 is coupled to the storage unit 1052 and configured for controlling and accessing the storage unit 1052 to send data to one electronic device and/or receive data from one electronic device. For data transmission, the controlling unit 1051 can control the access point device 105 to transmit data/frame(s) via unicast/multicast/broadcast schemes. A data frame is regarded as a multicast/broadcast frame if it is transmitted via multicast/broadcast schemes to multiple non-AP stations or all non-AP stations. A data frame is regarded as a unicast frame if it is transmitted via the unicast scheme to only one non-AP station. It is not necessary for non-AP station(s) to acknowledge if receiving the multicast/broadcast frame, and it is necessary for a non-AP station to acknowledge if receiving the unicast frame. For the multicast/broadcast frame, the access point device 105 needs to buffer this frame for a longer time period if any one non-AP station within this basic service set enters the power saving mode. If no non-AP stations enter the power saving mode, the access point device 105 does not need to buffer the multicast/broadcast frame.

One of the objectives of the present invention is to provide a scheme for delivering service discovery information to service providing station(s) considering the possible power saving handing situation of WLAN. In this embodiment, the electronic device 110B as a non-AP station can specify specific information such as service information to access point device 105 and/or exchange the specific information such as service information with access point device 105. The access point device 105 would learn that a matched frame should be delivered to the electronic device 110B by using an individually addressed frame (i.e. unicast transmission), and the handling of this frame would follow the rule of individually addressed frame either in power saving mode or in active mode/situation. Specifically, the controlling unit 1051 is arranged to buffer the multicast/broadcast frame(s) if any one station enters the power saving mode, and is capable of controlling the access point device 105 to treat a matched multicast/broadcast frame(s) as unicast frame(s) and transmit the unicast frame (s) to at least one electronic device by using the unicast transmission scheme. The controlling unit 1051 can also control the access point device 105 when and/or whether to transmit matched multicast/broadcast frame(s) to at least one electronic device by using the unicast transmission scheme. For example, the access point device 105 may be arranged to treat matched multicast/broadcast frame(s) as unicast frame(s) and transmit the unicast frame(s) to a non-AP station by using the unicast transmission scheme if this non-AP station is not in power saving mode. Due to the unicast transmission scheme, it is needed for the non-AP station to send back acknowledge information to the access point device 105 if the non-AP station receives the unicast frame(s). The controlling unit 1051 is arranged for comparing information of multicast/broadcast frame(s) with specific information to check if the information matches the specific information. Once the information of multicast/broadcast frame(s) matches the specific information, the controlling unit 1051 treats the matched multicast/broadcast frame(s) as unicast frame(s) and decides to control the access point device 105 to transmit the unicast frame(s) to the non-AP station by using the unicast transmission scheme if the non-AP station is not in the power saving mode. The specific information may be stored in the storage unit 1052 in advance or may be transmitted from one electronic device such as device 110B; corresponding description will be detailed later.

For a non-AP station such as electronic device 110B, the processing unit 1101 is coupled to the storage unit 1102 and for controlling and accessing the storage unit 1102. The processing unit 1101 is capable of controlling the electronic device 110B to send specific information to the access point device 105 so as to make the access point device 105 treat matched multicast/broadcast frame (s) as unicast frame (s) and transmit the unicast frame (s) to the electronic device 110B by using unicast transmission. The processing unit 1101 is also capable of controlling the electronic device 110B to decide when to and/or whether to send the specific information to the access point device 105. For example, the processing unit 1101 may control the electronic device 110B to send the specific information to the access point device 105 when the electronic device 110B is initially connected to the access point device 105. However, this is not intended to be a limitation. The electronic device 110B can send the specific information to the access point device 105 at any timing before a specific multicast/broadcast frame to be transmitted to the electronic device 110B (not only transmitted to the electronic device 110B) arrives at the access point device 105. The storage unit 1102 is arranged for storing the above-mentioned specific information.

In this embodiment, a multicast/broadcast frame to be transmitted from the access point device 105 to multiple/all stations belonging to the same basic service set may correspond to a service request transmitted from one non-AP station. For example, in this embodiment, it is assumed that the electronic device 110A is a service searching/requesting non-AP station, and the electronic devices 110B and 110C are service providing non-AP stations. The electronic device 110A may request a service, and the access point device 105 can de-capsulate frame(s) of the request of electronic device 110A and generate and transmit a multicast/broadcast frame to be transmitted to corresponding service providing non-AP stations. For instance, the electronic device 110B may be a wireless printer for providing printing service for other stations, and the electronic devices 110A may look for a printing service. In this embodiment, the service request of electronic devices 110A is transmitted via generic advertisement service (GAS) frames to the access point device 105. However, this is not a limitation of the invention.

Upper layer applications usually adopt multicast for service discovery such as SSDP (Simple Service Discovery Protocol) for UPnP (Universal Plug and Play), mDNS (Multicast DNS) for Bonjour, and WS-Discovery for Web service. For example, both the electronic devices 110B and 110C can provide the same services for the electronic device 110A, and the access point device 105 is arranged to send the service request frame to the electronic devices 110B and 110C by using multicast transmission; i.e., the service request frame is interpreted/translated by the access point device 105 as a multicast/broadcast frame although the service request frame was a unicast frame. According to the transmission protocol specified by IEEE 802.11 communication standard, a conventional access point is arranged to buffer the multicast/broadcast frame if there is a station in power saving mode, and then transmit the multicast/broadcast frame to non-AP stations by using multicast/broadcast transmission scheme after a delivery traffic indication map (DTIM) beacon has been transmitted. That is, multicast/broadcast frame(s) is/are designed to be buffered if any one station enters the power saving mode, and the multicast/broadcast frame(s) would be transmitted after one DTIM beacon has been transmitted. In this embodiment, the access point device 105 can check if the multicast/broadcast frame matches the specific information specified by one service providing non-AP station such as electronic device 110B, treat the multicast/broadcast frame if matched as a unicast frame, and transmit the unicast frame to the device 110B by using unicast transmission if the device 110B is not in power saving mode. In addition, if the device 110B is in power saving mode, the access point device 105 may transmit the unicast frame to the electronic device 110B by using unicast transmission scheme after the access point device 105 notifies the electronic device 110B of the unicast frame where the buffered multicast/broadcast frame in this situation is treated as an unicast frame by access point device 105 and can be also considered as an individually addressed frame.

The electronic device 110B as a service providing non-AP station can decide how often the electronic device 110B wakes up based on its battery remaining capacity condition and/or other power saving conditions. For example, if its battery remaining capacity is enough, the processing unit 1101 can control the electronic device 110B to notify the access point device 105 that multicast/broadcast frame(s) if any can be treated as unicast frame(s) and early transmitted to the electronic device 110B by using unicast transmission scheme. The processing unit 1101 can control the electronic device 110B not to notify the access point device 105 of transmitting unicast or individually addressed frame(s) by using unicast transmission scheme if its battery remaining capacity is not enough. However, this is not intended to be a limitation of the present invention. Specifically, the processing unit 1101 is arranged to control the electronic device 110B to send specific information to the access point device 105 so as to make the access point device 105 treat matched multicast/broadcast frame(s) as unicast frame(s) and transmit the unicast frame(s) to electronic device 110B by using unicast transmission. The sent specific information may specify at least one traffic class type comprising at least one of service type, service identifier, and upper layer protocol identifier, etc.

After the access point device 105 receives the specified specific information sent from the electronic device 110B, the controlling unit 1051 is arranged for checking whether multicast/broadcast frame(s) for the electronic device 110B exists or is required. The controlling unit 1051 compares information carried within multicast/broadcast frame(s) with the specified specific information such as traffic class type, and determines that the multicast/broadcast frame(s) is to be sent for the electronic device 110B if the carried information matches the specified specific information such as traffic class type. The controlling unit 1051 then treats the matched multicast/broadcast frame(s) as unicast frame(s) and controls the access point device 105 to notify the electronic device 110B that unicast frame(s) is for the electronic device 110B. The access point device 105 is arranged to inform the electronic device 110B that there exists the above-mentioned unicast frame(s) to be transmitted for the electronic device 110B by sending a beacon including TIM element. TIM element can be used for informing a station in the power saving mode of buffered unicast frame(s). For the electronic device 110B in power saving mode, the processing unit 1101 is arranged to control the electronic device 110B to listen to the access point device 105 each time when access point device 105 is sending a beacon to check whether there is any frame(s) to be transmitted for the electronic device 110B. Since a beacon including TIM element is designed to occur more frequently than a DTIM beacon which is transmitted every DTIM interval, the electronic device 110B can more early know whether there exists the above-mentioned unicast frame(s) to be transmitted for the electronic device 110B. Next, if there exists the above-mentioned unicast frame(s) to be transmitted for the electronic device 110B, the electronic device 110B does not switch back to the power saving mode, and the access point device 105 can transfer data (i.e. service request frame(s)) to the electronic device 110B via unicast transmission scheme. Instead, if knowing no unicast frame(s) to be transmitted for the electronic device 110B, the electronic device 110B switches back to power saving mode. Since the access point device 110 can transfer data (i.e. service request frame(s)) to the electronic device 110B via unicast transmission scheme earlier, accordingly the service requesting station 110A can be earlier acknowledged from the service providing station 110B. This effectively reduces a long service discovery delay.

In practice, the above proposed scheme is implemented and applied for directed multicast traffic delivery. The proposed scheme can be applied into the pre-association discovery protocol and the post-association discovery protocol for directed multicast traffic delivery in wireless network. However, this is not intended to be a limitation of the present invention. In other embodiments, applying the operation of transmitting multicast/broadcast frame(s) by using unicast transmission scheme into other wireless network examples also obeys the spirit of the invention. The access point device 105 receives GAS frame from a service requesting station using pre-association discovery protocol, and the access point device 105 needs to interpret or re-generate a multicast frame based on content of the GAS frame. Alternatively, in post-association discovery protocol, the access point device 105 may receive GAS frame from a service requesting station or may receive a multicast/broadcast frame from the service requesting station, and the access point device 105 may not need to interpret or re-generate a new multicast/broadcast frame if receiving the multicast/broadcast frame. For the directed multicast traffic delivery, the electronic device 110B as a service providing station specifies the specific information. For example, the specific information comprises traffic classes or classifier types. The electronic device 110B can add a new classifier type, type 6, to the existing directed multicast service (DMS) frame classifier to modify the traffic classes for pre-association discovery protocol. The DMS descriptor may include Service Type, Service Identifier (SID), Upper Layer Protocol (ULP) ID and other necessary information for the purpose of identifying service query from the service searching non-AP station. The SID is a short identifier of either a hash value (unique service identifier) or a number, which identifies a service. All these information or data can be transmitted from the service providing non-AP station to the access point device 105 before the service requesting non-AP station requests a service.

With intended services, the electronic device 110A as a service searching (or requesting) non-AP station uses generic advertisement service (GAS) frames to transmit the pre-association discovery protocol (PADP) requests. There can be several types of PADP requests. For example, a PADP request frame may include service type and service identifier hash (SIH). Alternatively, a PADP request frame may include service type and service identifier number SIN). Alternatively, a PADP request frame may include upper layer protocol (ULP) encapsulation. In addition, the above-mentioned service type may include types such as peripheral, WEB Service, streaming multimedia, interactive multimedia, location based services, etc. All the examples are not intended to be limitations of the invention.

After receiving the PADP requests from a service requesting/searching station such as electronic device 110A, depending on the PADP request types, the controlling unit 1052 of access point device 105 may be arranged to interpret information of service type and SIH and to generate the ULP and execute DMS. Alternatively, the controlling unit 1051 of access point device 105 may be arranged to interpret information of Service Type and SIN and to generate the ULP and execute DMS. Alternatively, the controlling unit 1051 of access point device 105 may be arranged to de-capsulate the ULP and execute DMS.

Compared to only listening to DTIM beacons, the electronic device 110B as a service providing non-AP station can decide to wake up more often to check and retrieve service query (i.e. service request from electronic device 110A and transferred by the access point device 105) if power saving is not a big issue in such use case. When the electronic device 110B switches from power saving mode back to active mode (i.e. normal mode), the access point device 105 is arranged for sending the service query to electronic device 110B directly. The service query can thus be sent using a higher data transmission rate higher than data transmission rate of normal multicast and get the benefit of high reliability as well. Therefore, the delay is efficiently shortened and the transmissions of discovery frames are more reliable and faster when compared to an existing conventional scheme. Also, since the existing conventional scheme only figures out the discovery protocol rather than the intended service, the proposed scheme of the invention can reduce unnecessary communications for mismatched service queries.

Further, in another embodiment corresponding to the standard established by IEEE 802.11ak GENERAL LINK (GLK) Task Group, the specific information mentioned above comprises GLK capability elements for example. The access point device 105 and electronic device 110B of IEEE 802.11ak GLK both learn that the access point device 105 or electronic device 110B is GLK-capable AP or GLK-capable non-AP station after receiving or exchanging GLK capability elements in a beacon, probe request, probe response, association request, association response, re-association request, re-association response, mesh peering open, or mesh peering confirm from the other side.

Figure 2A:
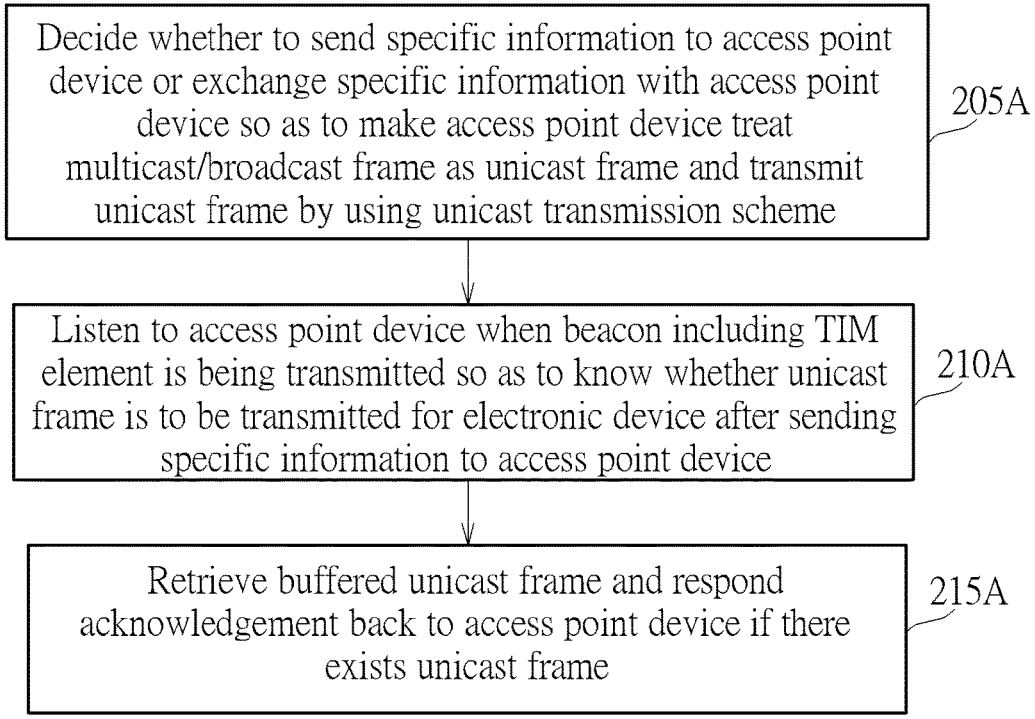
FIG. 2A and FIG. 2B are simplified flowcharts of operations of electronic device and access point device as shown in FIG. 1.
Figure 2B:
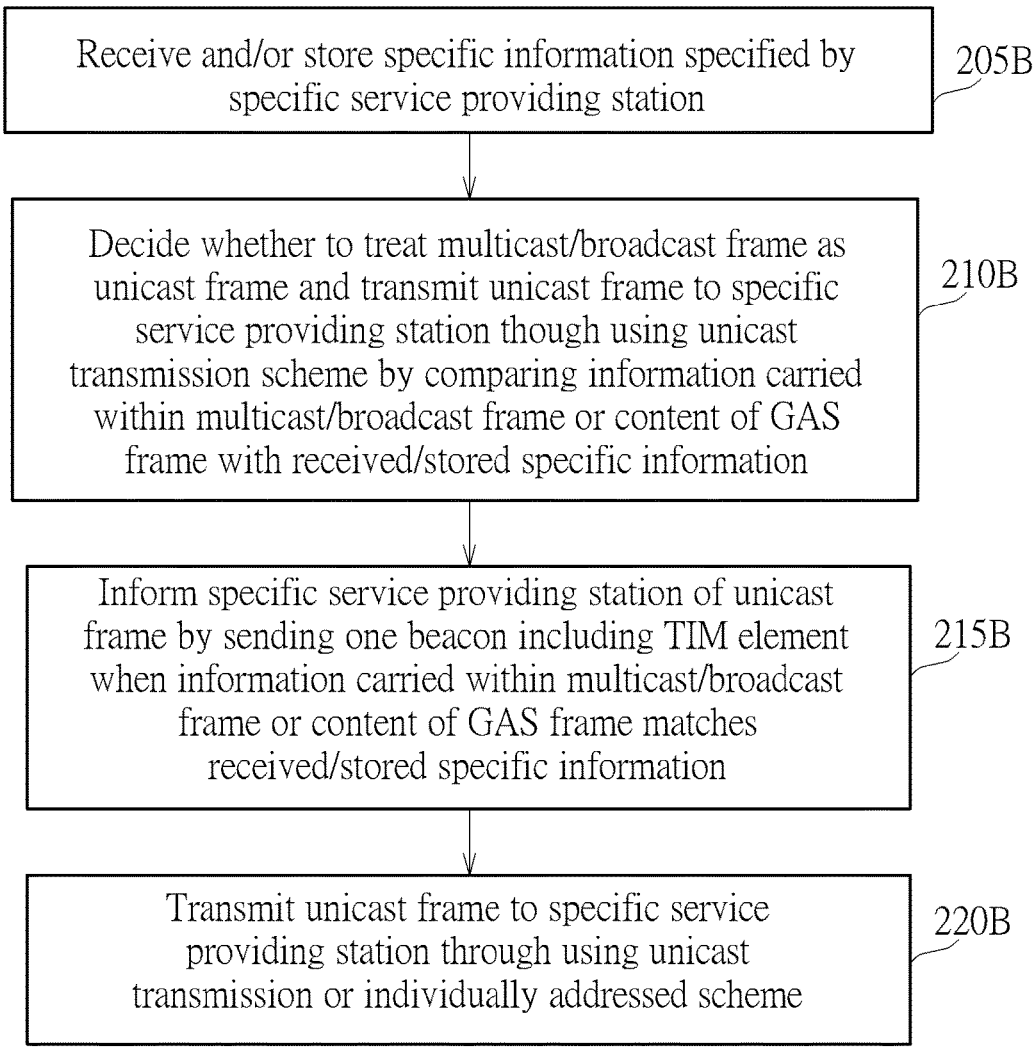

In order to make readers more clearly understand the spirit of the present invention, FIG. 2A and FIG. 2B respectively show simplified flowcharts of operations of electronic device 110B and access point device 105 as shown in FIG. 1. Provided that substantially the same result is achieved, the steps of the flowchart shown in FIG. 2A and FIG. 2B need not be in the exact order shown and need not be contiguous, that is, other steps can be intermediate. Descriptions of steps of FIGS. 2A and 2B are detailed in the following:

Step 205A: The electronic device 110B as a service providing station decides whether to send specific information to the access point device 105 or exchange the specific information with access point device 105 so as to make the access point device 105 treat a matched multicast/broadcast frame as a unicast frame and transmit the unicast frame by using unicast transmission scheme;

Step 210A: The electronic device 110B listens to the access point device 105 when a beacon including TIM element is being transmitted so as to know whether a unicast frame is to be transmitted for electronic device 110b after the electronic device 110B sends specific information to the access point device 105; and Step 215A: The electronic device 110B retrieves the buffered unicast frame and responds acknowledgement back to the access point device 105 if there exists the unicast frame.

Step 205B: The access point device 105 receives and/or stores specific information specified by a specific service providing station such as electronic device 110B;

Step 210B: The access point device 105 decides whether to treat a multicast/broadcast frame as a unicast frame and transmit the unicast frame to the specific service providing station though using the unicast transmission scheme by comparing information carried within the multicast/broadcast frame or content of GAS frame with the received/stored specific information;

Step 215B: The access point device 105 informs the specific service providing station of the unicast frame by sending one beacon including TIM element when information carried within the multicast/broadcast frame or content of GAS frame matches the received/stored specific information; and Step 220B: The access point device 105 transmits the unicast frame to specific service providing station through using unicast transmission or individually addressed scheme.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a storage circuit, configured for storing specific information of a directed multicast service descriptor; and
   a processing circuit, coupled to the storage circuit, for controlling and accessing the storage circuit;
   wherein the processing circuit is capable of accessing the specific information of the directed multicast service descriptor within the storage circuit to control the electronic device to send the specific information of the directed multicast service descriptor to an access point device so as to make the access point device interpret or translate a service discovery request frame into a multicast/broadcast frame and determine whether to treat the multicast/broadcast frame as a specific unicast frame and transmit the specific unicast frame by using unicast transmission; the multicast/broadcast frame is treated as the specific unicast frame by the access point device if information carried by the service discovery request frame, transmitted from another electronic device, matches with the specific information of the directed multicast service descriptor.

2. The electronic device of claim 1, wherein the specific information of the directed multicast service descriptor comprises at least one of service type, service identifier, and upper layer protocol identifier.

3. The electronic device of claim 1, wherein after sending the specific information of the directed multicast service descriptor to the access point device, the processing circuit is arranged for controlling the electronic device to listen to the access point device during each time when the access point device is sending a beacon including TIM element, so as to check whether there is any unicast frame to be transmitted for the electronic device.

4. The electronic device of claim 3, wherein the processing circuit is arranged for controlling the electronic device to retrieve data from the access point device when knowing that a unicast frame is to be transmitted to the electronic device.

5. The electronic device of claim 3, wherein if the electronic device is in a power saving mode, the electronic device wakes up to listen to the access point device when the access point device is sending the beacon including TIM element.

6. An access point device for wirelessly communicating with at least one electronic device, comprising:
   a storage circuit; and
   a controlling circuit, coupled to the storage circuit, configured for controlling and accessing the storage circuit;
   wherein the controlling circuit is capable of controlling the access point device to interpret or translate a service discovery request frame into a multicast/broadcast frame and determine whether to treat the multicast/ broadcast frame as a specific unicast frame and transmit the specific unicast frame to a service providing electronic device by using unicast transmission according to specific information of a directed multicast service descriptor received from the electronic device and stored within the storage circuit; the multicast/broadcast frame is treated as the specific unicast frame by the access point device if information carried by the service discovery request frame, transmitted from a service requesting electronic device, matches with the specific information of the directed multicast service descriptor.

7. The access point device of claim 6, wherein the specific information of the directed multicast service descriptor comprises at least one of service type, service identifier, and upper layer protocol identifier.

8. The access point device of claim 6, wherein the controlling circuit controls the access point device to inform the service providing electronic device that the unicast frame to be transmitted is for the service providing electronic device by sending a beacon including TIM element.

9. The access point device of claim 8, wherein after informing the service providing electronic device that the unicast frame to be transmitted is for the service providing electronic device, the controlling circuit controls the access point device to send the unicast frame to the service providing electronic device by using the unicast transmission.

10. The access point device of claim 8, wherein when the access point device is sending each beacon including TIM element, the controlling circuit controls the access point device to inform the service providing electronic device that the unicast frame to be transmitted is for the service providing electronic device, before the unicast frame has been transmitted.

11. A method operating on an electronic device, comprising:
  using a storage unit for storing specific information of a directed multicast service descriptor;
  accessing the specific information of the directed multicast service descriptor within the storage unit; and
  sending the specific information of the directed multicast service descriptor to an access point device so as to make the access point device interpret or translate a service discovery request frame into a multicast/broadcast frame and determine whether to treat the multicast/broadcast frame as a specific unicast frame and transmit the specific unicast frame by using unicast transmission;
  wherein the multicast/broadcast frame is treated as the specific unicast frame if information carried by the service discovery request frame, transmitted from another electronic device, matches with the specific information of the directed multicast service descriptor.

12. The method of claim 11, wherein the specific information of the directed multicast service descriptor comprises at least one traffic class type including at least one of service type, service identifier, and upper layer protocol identifier.

13. The method of claim 11, further comprising:
  listening to the access point device during each time when the access point device is sending a beacon including TIM element so as to check whether there is any unicast frame to be transmitted for the electronic device after sending the specific information of the directed multicast service descriptor to the access point device.

14. The method of claim 13, further comprising:
  retrieving data from the access point device when knowing that a unicast frame is to be transmitted to the electronic device.

15. A method operating on an access point device for wirelessly communicating with at least one electronic device, comprising:
  using a storage unit for storing specific information of a directed multicast service descriptor;
  accessing the specific information of the directed multicast service descriptor within the storage unit;
  interpreting or translating a service discovery request frame into a multicast/broadcast frame; and
  determining whether to treat the multicast/broadcast frame as a specific unicast frame and transmitting the specific unicast frame to a service providing electronic device by using unicast transmission according to specific information of the directed multicast service descriptor stored within the storage unit;
  wherein the multicast/broadcast frame is treated as the specific unicast frame if information carried by the service discovery request frame, transmitted from a service requesting electronic device, matches with the specific information of the directed multicast service descriptor.

16. The method of claim 15, wherein the specific information of the directed multicast service descriptor comprises at least one of service type, service identifier, and upper layer protocol identifier.

17. The method of claim 15, further comprising:
  controlling the access point device to inform the service providing electronic device that the unicast frame to be transmitted is for the service providing electronic device by sending a beacon including TIM element.

* * * * *